(12) United States Patent
Yoneda et al.

(10) Patent No.: US 7,905,760 B2
(45) Date of Patent: Mar. 15, 2011

(54) ROBOT TOY AND ASSEMBLING METHOD THEREOF

(75) Inventors: Yosuke Yoneda, Tokyo (JP); Kimitaka Watanabe, Tokyo (JP)

(73) Assignee: Tomy Company, Ltd., Tokyo (JP)

( * ) Notice: Subject to any disclaimer, the term of this patent is extended or adjusted under 35 U.S.C. 154(b) by 117 days.

(21) Appl. No.: 12/328,457

(22) Filed: Dec. 4, 2008

(65) Prior Publication Data
US 2009/0149109 A1 Jun. 11, 2009

(30) Foreign Application Priority Data
Dec. 7, 2007 (JP) .................................. 2007-317402

(51) Int. Cl.
*A63H 11/18* (2006.01)
*A63H 33/04* (2006.01)
(52) U.S. Cl. ........................ 446/353; 446/330; 446/354
(58) Field of Classification Search .................. 446/325, 446/326, 330, 332, 335, 338, 344, 348, 352–355, 446/358
See application file for complete search history.

(56) References Cited

U.S. PATENT DOCUMENTS

| | | | |
|---|---|---|---|
| 3,547,240 A | 12/1970 | Holper | |
| 4,831,893 A | 5/1989 | Obama et al. | |
| 5,155,423 A | 10/1992 | Karlen et al. | |
| 5,158,493 A * | 10/1992 | Morgrey | 446/355 |
| 5,280,981 A | 1/1994 | Schulz | |
| 5,318,471 A * | 6/1994 | Glovier | 446/268 |
| 6,454,624 B1 * | 9/2002 | Duff et al. | 446/91 |
| 6,902,048 B1 | 6/2005 | Chung | |
| 2005/0167167 A1 | 8/2005 | Miyazaki et al. | |
| 2005/0184697 A1 * | 8/2005 | Iribe et al. | 318/568.12 |
| 2006/0033462 A1 * | 2/2006 | Moridaira | 318/568.12 |
| 2008/0160873 A1 * | 7/2008 | Yoneda | 446/86 |

FOREIGN PATENT DOCUMENTS

| | | |
|---|---|---|
| EP | 1 358 971 | 11/2003 |
| JP | 64-43996 | 3/1989 |
| JP | 3-77754 | 12/1991 |
| JP | 9-193059 | 7/1997 |
| JP | 2002-59388 | 2/2002 |
| JP | 2003-136461 | 5/2003 |

(Continued)

OTHER PUBLICATIONS

Japanese Office mailed Jul. 14, 2009 in Japanese Priority Application No. 2007-371402. (3 pages) (5 pages English translation).

(Continued)

*Primary Examiner* — Nini Legesse
(74) *Attorney, Agent, or Firm* — Staas & Halsey LLP

(57) ABSTRACT

A robot toy including: a first block including a servo; a second block connected to the first block by fitting an output shaft of the servo into a boss; and a servo control section. The servo is provided with, a first disk to rotate with the output shaft; a second disk provided facing the first rotating disk to rotate relatively to the first rotating disk in a plane parallel to the first rotating disk according to user operation; and an angle detection section to detect a relative angle between predetermined reference lines on the first and second disks. The servo control section includes a center position control section to rotate the output shaft and the first rotating disk, and to control the servo while a position of the servo, when the relative angle is 0, is at a center position.

6 Claims, 13 Drawing Sheets

FOREIGN PATENT DOCUMENTS

| | | |
|---|---|---|
| JP | 2004-209250 | 7/2004 |
| JP | 2004-255475 | 9/2004 |
| JP | 2006-035405 | 2/2006 |
| JP | 2006-35405 | 2/2006 |
| JP | 2006-239848 | 9/2006 |
| JP | 2008-161350 | 7/2008 |

OTHER PUBLICATIONS

Patent Abstracts of Japan, Publication No. 2006-35405, Published Feb. 9, 2006.

Patent Abstracts of Japan, Publication No. 2004-255475, Published Sep. 16, 2004.

Minoru Otsuka, "[Coramu] Ore no Robotto (5) Homu Pozishon wo Settei site Sanpuru Moshon wo Ugogaku", [online], Sep. 18, 2006, Maicomi Journal, Retrieved on Jul. 7, 2009 from http://journal.mycom.co.jp/column/orerobo/005/index.html.

Nisoku Hokou Robotto Seisaku Chonyumon, Published by Ohmsha, Ltd., Oct. 5, 2006, third impression of the first edition, pp. 140-141 and cover and last page.

Japanese Office Action issued Aug. 25, 2009 in Japanese Patent Application 2006-352818 (2 pages) (3 pages English Translation).

European Search Report dated May 27, 2008 in Application No. 07122348.1.

"Nisokuhoko robotto seisaku chonyuumon", Kabushikikaisha Ohmsha. Third Impression of first edition, pp. 140-141 Oct. 5, 2006, Section 4.3.

Final Office Action mailed Dec. 29, 2009, U.S. Appl. No. 11/822,300.

Non-Final Office Action mailed Jul. 16, 2009, U.S. Appl. No. 11/822,300.

Decision on Petition in U.S. Appl. No. 11,822,300, dated Jul. 10, 2009.

Office Action (Election Requirement) mailed Apr. 27, 2009, U.S. Appl. No. 11/822,300.

U.S. Appl. No. 11/822, 300, filed Jul. 3, 2007, Yosuke Yoneda, Tomy Company, LTD.

Japanese Office Action issued Aug. 25, 2009 in Japanese Patent Application 2006-352818 (2 pages) (3 pages English Translation).

Patent Abstracts of Japan, Publication No. 2002-59388, Published Feb. 26, 2002.

Japanese Office Action dated Jan. 27, 2009 in Japanese Application No. 2006-352818.

European Search Report dated May 27, 2008 in Application No. 07122348.1.

"Nisokuhoko robotto seisaku chonyuumon", Kabushikikaisha Ohmsha. Third Impression of first edition, pp. 140-141 Oct. 5, 2006, Section 4.3.

Final Office Action mailed Dec. 29, 2009, U.S. Appl. No. 11/822,300.

Non-Final Office Action mailed Jul. 16, 2009, U.S. Appl. No. 11/822,300.

Decision on Petition in U.S. Appl. No. 11,822,300, dated Jul. 10, 2009.

Office Action (Election Requirement) mailed Apr. 27, 2009, U.S. Appl. No. 11/822,300.

Patent Abstracts of Japan, Publication No. 2004-209250, Published Jul. 29, 2004.

Patent Abstracts of Japan, Publication No. 2003-136461, Published May 14, 2003.

Patent Abstracts of Japan, Publication No. 9-193059, Published Jul. 29, 1997.

Patent Abstracts of Japan, Publication No. 2006-035405, Published Feb. 9, 2006.

Patent Abstracts of Japan, Publication No. 2006-239848, Published Sep. 14, 2006.

* cited by examiner

ROBOT TOY AND ASSEMBLING METHOD THEREOF

BACKGROUND OF THE INVENTION

1. Field of the Invention

The present invention relates to a robot toy and an assembling method of the robot toy, and in particular, a robot toy including a servo and an assembling method of the robot toy.

2. Description of Related Art

Conventionally, a robot toy with a structure of connecting one block and another block with a servo is known. In such a robot toy, it is common to assemble the robot toy in a following way.

First, a leg of a humanoid robot toy is described. Here, components of the leg include one block mounted with an RC turbo thereon and the other block to be connected to the one block. In this case, first, an initial voltage is placed on a signal line of a servo to figure out a center position (servo zero position) and an output shaft of the servo is fitted into a boss of the other block at a home position (basic starting position) of the one block and the other block. In this way, adjoining blocks are attached together. With this, the entire leg is assembled.

Also similar to the leg, components of an arm, a torso and a head, and the torso and limbs are connected (for example, see "Nisoku Hokou Robotto Seisaku Chonyumon (Basic Introduction of Making a Robot Walking on Two Feet)" published by Ohmsha, Ltd. Oct. 5, 2006, third impression of the first edition, 140-141).

A spline is usually provided in the output shaft of the servo. In this case, in order to fit the output shaft into the boss, the spline of the output shaft and a concave section of an inner circumference of the boss need to be meshed.

However, generally only a few threads are provided on the spline of the output shaft of the servo and a positional relation when the output shaft of the servo is fitted into the boss is limited to a few types. Therefore, when the spline is provided in the output shaft of the servo, it is difficult to fit the output shaft of the servo into the boss at a position where the servo zero position of the servo motor and the home position of the robot toy match.

On the other hand, when the spline is not provided on the output shaft of the servo, degree of freedom of the positional relation of fitting the output shaft of the servo into the boss is too high, and it is difficult to fit the output shaft of the servo into the boss at a position where the servo zero position and the home position match.

Therefore, conventionally, a control IC in the robot toy is connected to a personal computer so that the servo zero position and the home position is matched with an editor.

However, such operation is complicated.

Such a situation may occur when there is an error in design of the components of the robot toy.

SUMMARY OF THE INVENTION

The present invention has been made in consideration of the above problems, and it is one of main objects to provide a robot toy and an assembling method thereof to easily match a home position and a servo zero position of a robot toy.

According to a first aspect of the present invention, there is provided a robot toy comprising:

a first block including a servo;

a second block connected to the first block by fitting an output shaft of the servo into a boss; and a servo control section to control the servo, wherein the servo is provided with, a first rotating disk to rotate following the output shaft;

a second rotating disk provided facing the first rotating disk to rotate relatively to the first rotating disk in a plane parallel to the first rotating disk according to user operation; and an angle detection section to detect a relative angle between predetermined reference lines on the first rotating disk and the second rotating disk, and the servo control section includes a center position control section to rotate the output shaft and the first rotating disk, and to control the servo while a position of the servo when the relative angle is 0 is a center position.

According to the robot toy, one block is connected to the other block through a servo, and the servo is provided with a first rotating disk rotating following the output shaft, a second rotating disk provided facing the first rotating disk to rotate relatively to the first rotating disk in a plane parallel to the first rotating disk according to user operation, and an angle detection section to detect a relative angle between predetermined reference lines of the first rotating disk and the second rotating disk, and the servo control section includes a center position control section to rotate the output shaft and the first rotating disk and to control the servo while the position of the servo when the relative angle is 0 is a center position, therefore, the center position of the servo can be matched to the home position by judging whether or not the positional relation of the one block and the other block matches the home position after the center position of the servo is output by the servo control section, and by repeating steps of rotating the second rotating disk relatively to the first rotating disk when it is judged the positional relation does not match the home position, and allowing the servo control section to output the center position again to judge whether or not the positional relation matches the home position. Therefore, since the servo zero position can be matched to the home position without connecting the servo to a personal computer and operating the editor, the home position and the servo zero position of the robot toy can be easily matched.

In the robot toy of the present invention, the angle detection section includes variable resistance circuits provided on faces of the first rotating disk and the second rotating disk facing each other, and resistance values of the variable resistance circuits change according to the relative angle.

In the robot toy of the present invention, the second rotating disk includes a lever protruding outward than a case of the servo and the second rotating disk rotates relatively to the first rotating disk by user operation of the lever.

In this case, the second rotating disk includes a lever protruding outward than the case of the servo, and the second rotating disk rotates relatively to the first rotating disk by user operation of the lever, therefore, the second rotating disk can be rotated without removing the case of the servo. Consequently, the home position and the servo zero position of the robot toy can be matched more easily.

According to a second aspect of the present invention, there is provided an assembling method of a robot toy to assemble a robot toy of the first aspect of the present invention, the method comprising the successive steps of:

fitting the output shaft into the boss;

outputting the center position of the servo by the servo control section; and judging whether or not a positional relation between the first block and the second block matches home position, wherein when judged in the judging step the positional relation does not match the home position, the method repeats a rotation angle adjusting step where the second rotating disk rotates relatively to the first rotating disk, the center position outputting step and the judging step; and when judged in the judging step the positional relation matches the home position, connecting of the first block and the second block ends.

According to assembling method of the robot toy, fitting the output shaft into the boss, outputting the center position of the servo by the servo control section and judging whether or not the positional relation of the one block and the other block match the home position are performed in this order, and when the judging step judges the positional relation does not match the home position, the method repeats rotation angle adjusting step where the second rotating disk rotates relatively to the first rotating disk, the center position outputting step and the judging step, and when the judging step judges the positional relation matches the home position, connecting of the one block and the other block ends, therefore, the robot toy can be assembled with the center position of the servo matching to the home position. Consequently, the robot toy can be assembled easily matching the home position and the servo zero position of the robot toy.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein.

DESCRIPTION OF THE EMBODIMENTS

A robot toy of the present invention will be described below.

Figure 1:
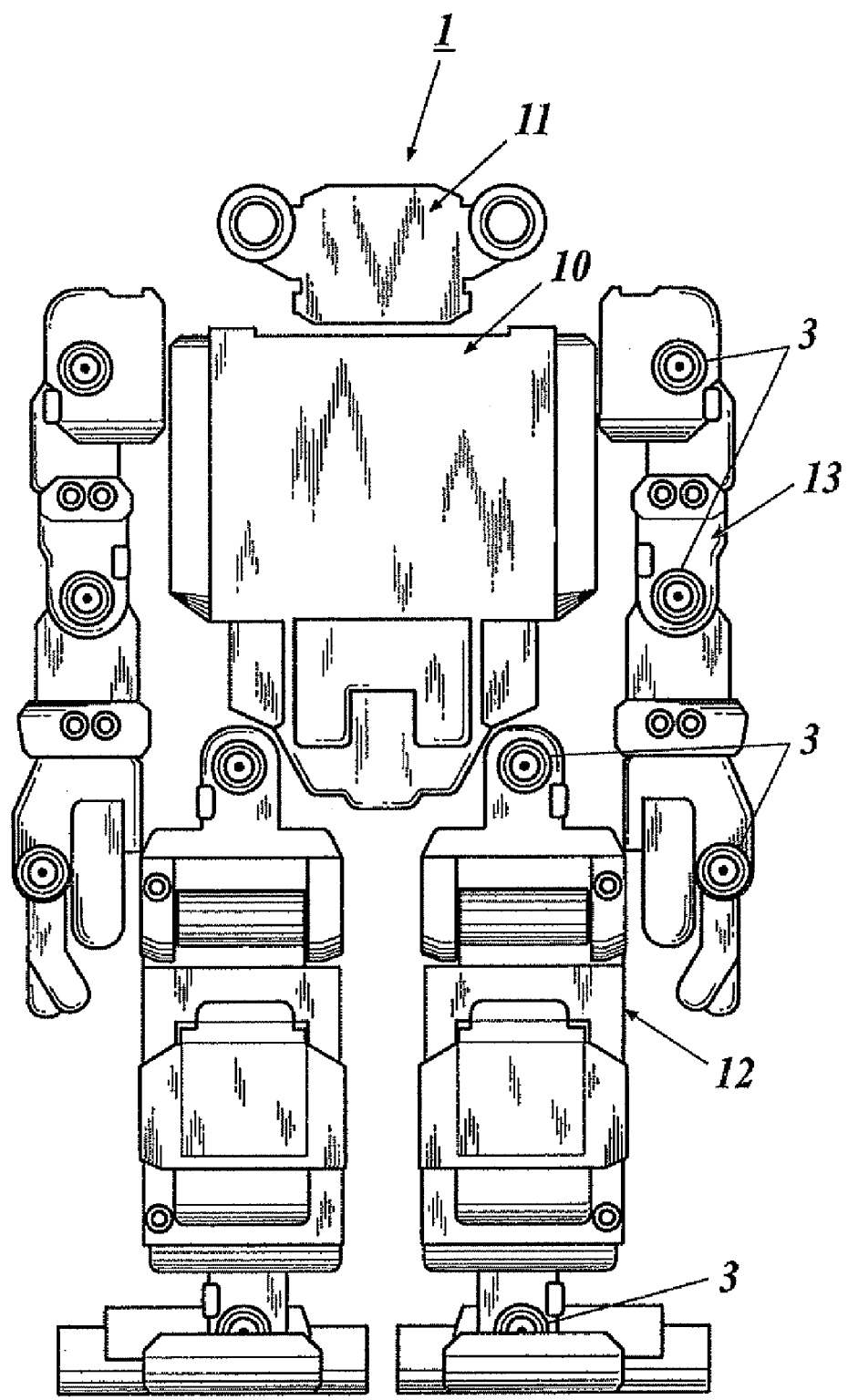
FIG. 1 is an elevation view showing a robot toy of the present embodiment.
Figure 2:
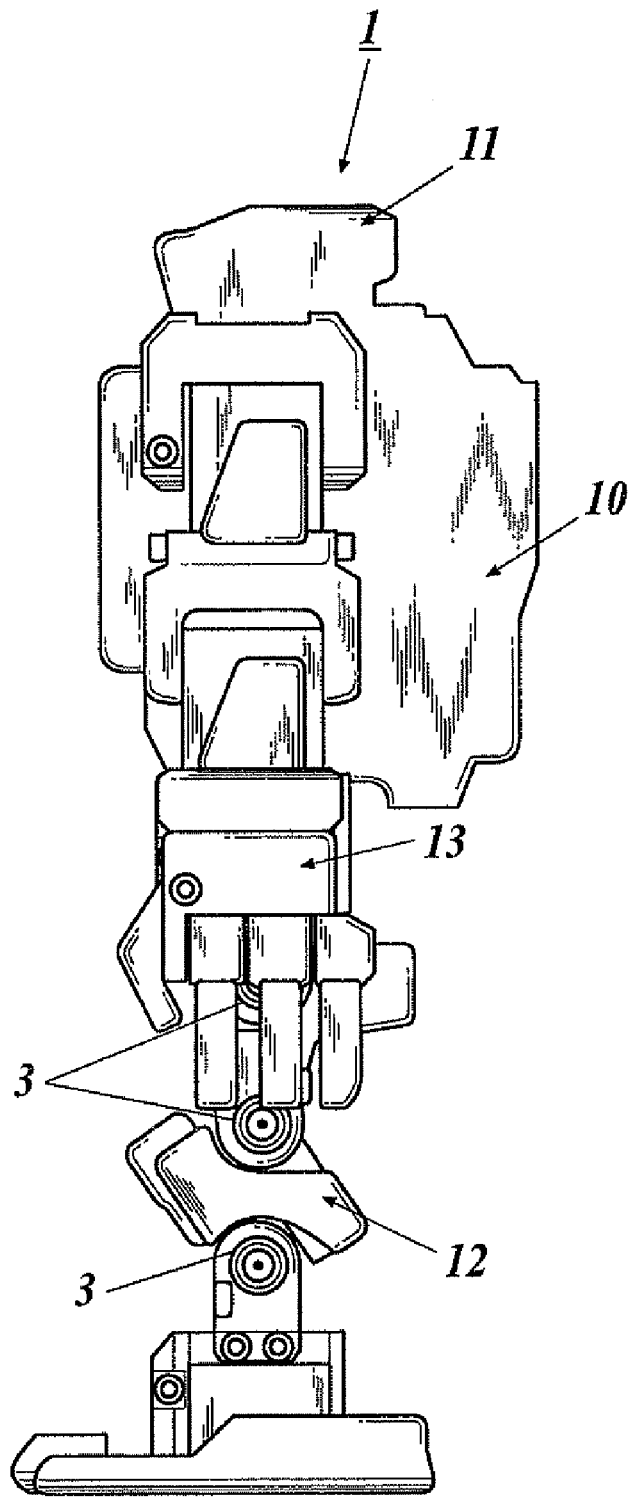
FIG. 2 is a right side view showing a robot toy of the present embodiment.

FIG. 1 is an elevation view showing a robot toy 1 of the present embodiment and FIG. 2 is a right side view showing a robot toy 1.

Motion of the robot toy 1 is controlled remotely by operation of a controller which is not shown. Specifically, the robot toy 1 includes a torso section 10, head section 11, leg section 12, and arm section 13 and joint portions of the leg section 12 and arm section 13 each include a servo 3 driven according to operation of the controller.

Figure 3:
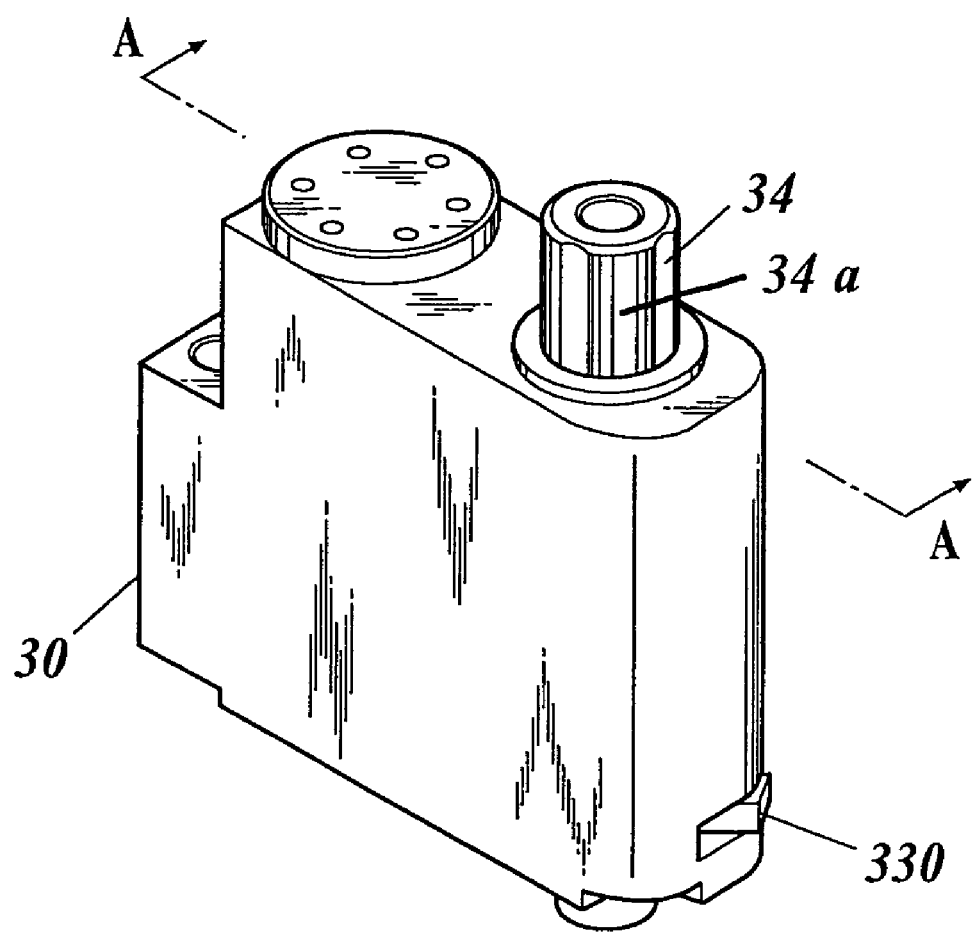
FIG. 3 is a perspective view showing an example of a servo.
Figure 4:
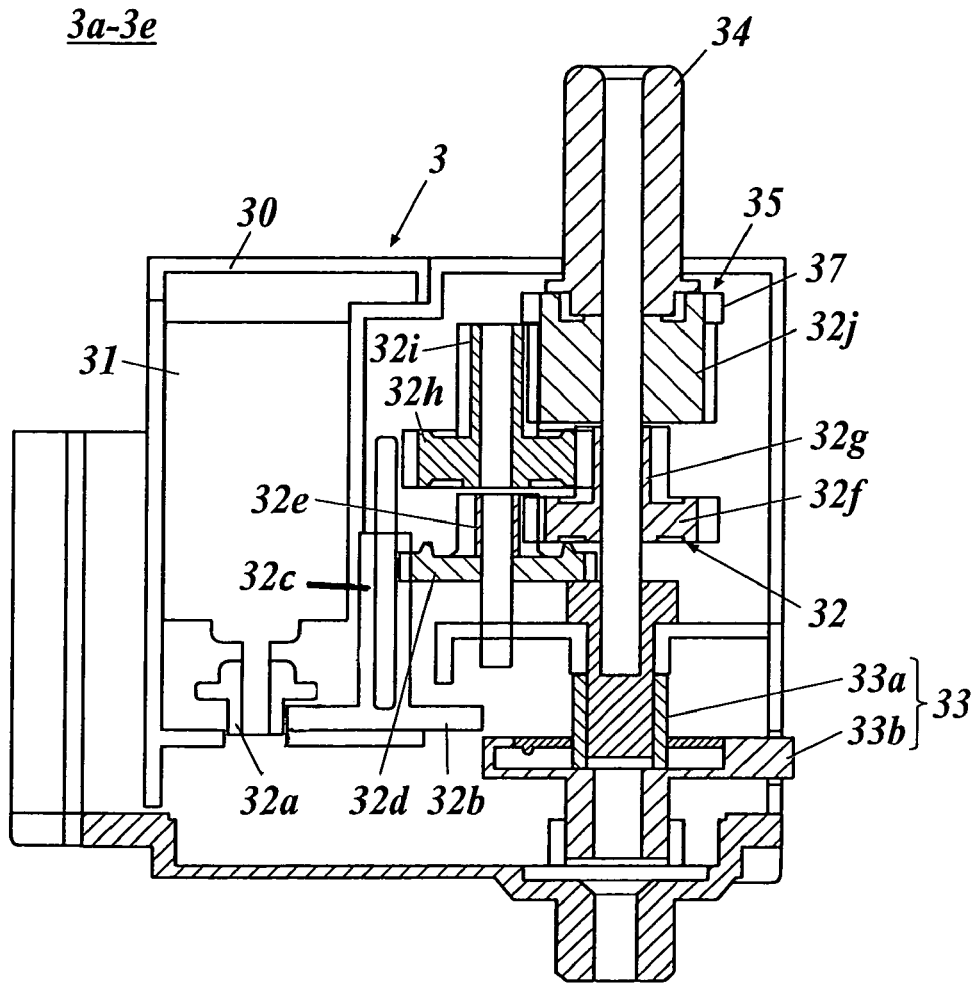
FIG. 4 is a cross-sectional view showing a cross-section taken along line A-A shown in FIG. 3.

As shown in FIG. 3 and FIG. 4, the servo 3 is driven to rotate the output shaft 34 and inside a case 30, includes a servo motor 31, reduction gear mechanism 32 and potentiometer 33.

Among these, the servo motor 31 rotates the reduction gear mechanism 32.

The reduction gear mechanism 32 includes gears 32a to 32j and the power output from the servo motor 31 transfers in the order of the gears 32a to 32j to rotate the output shaft 34.

Figure 5:
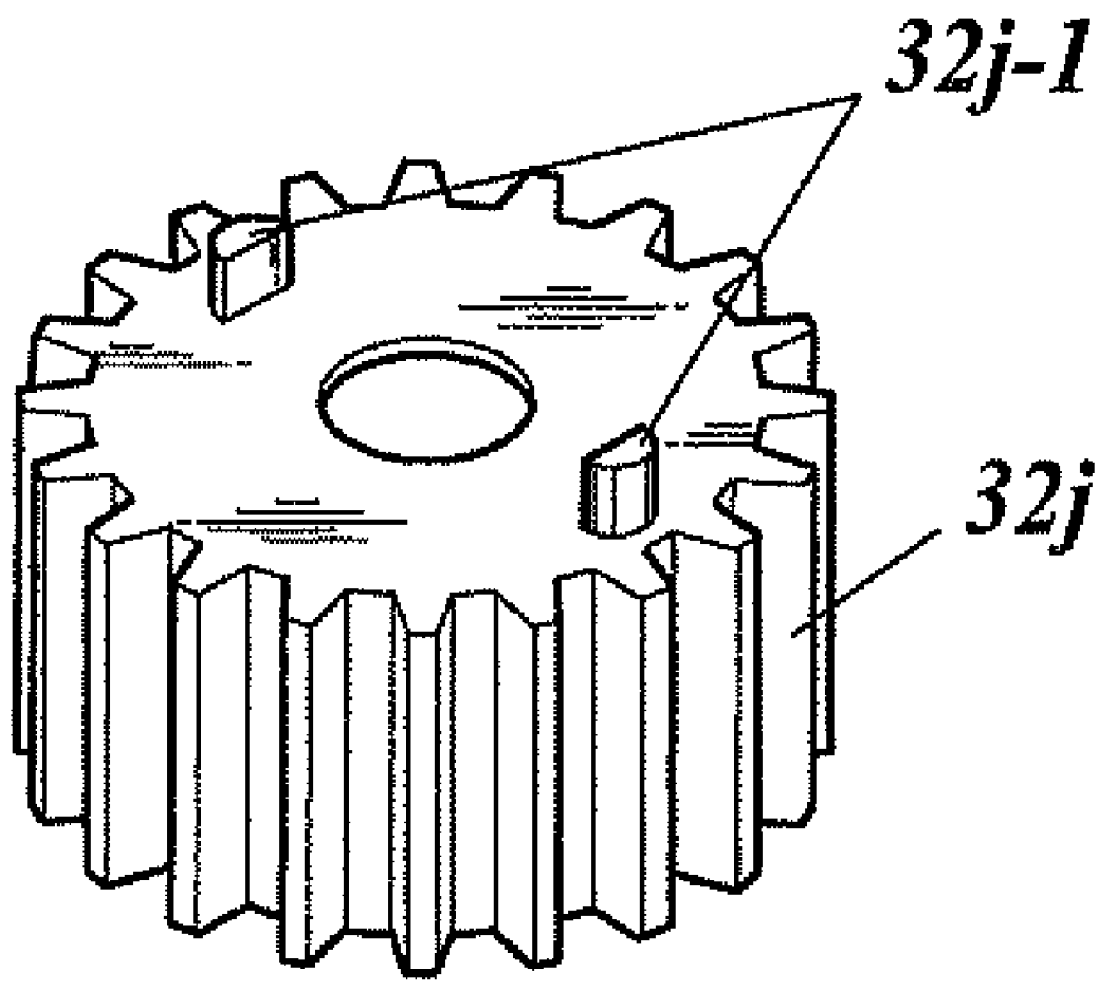
FIG. 5 is a perspective view showing a gear in a reduction gear mechanism constituting a servo of the present embodiment.
Figure 6:
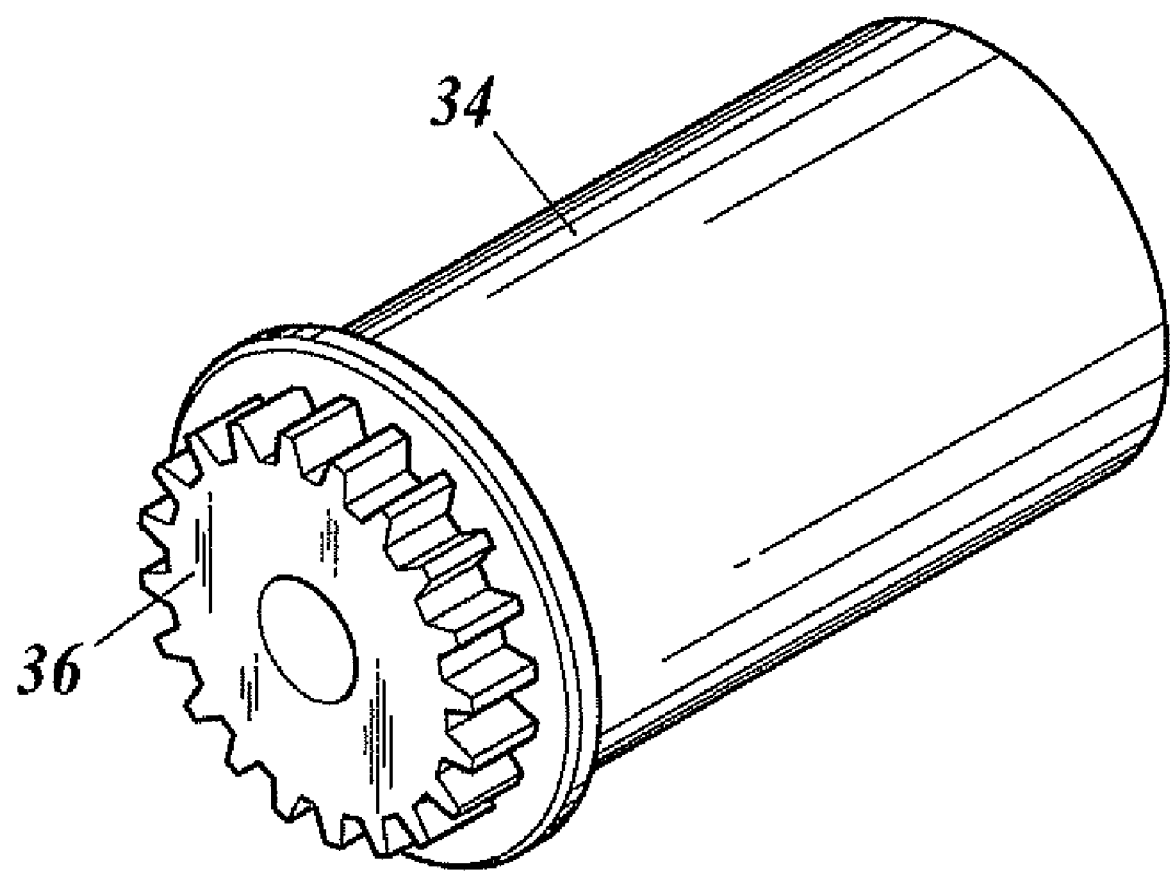
FIG. 6 is a perspective view showing an output shaft of the servo of the present embodiment.
Figure 7:
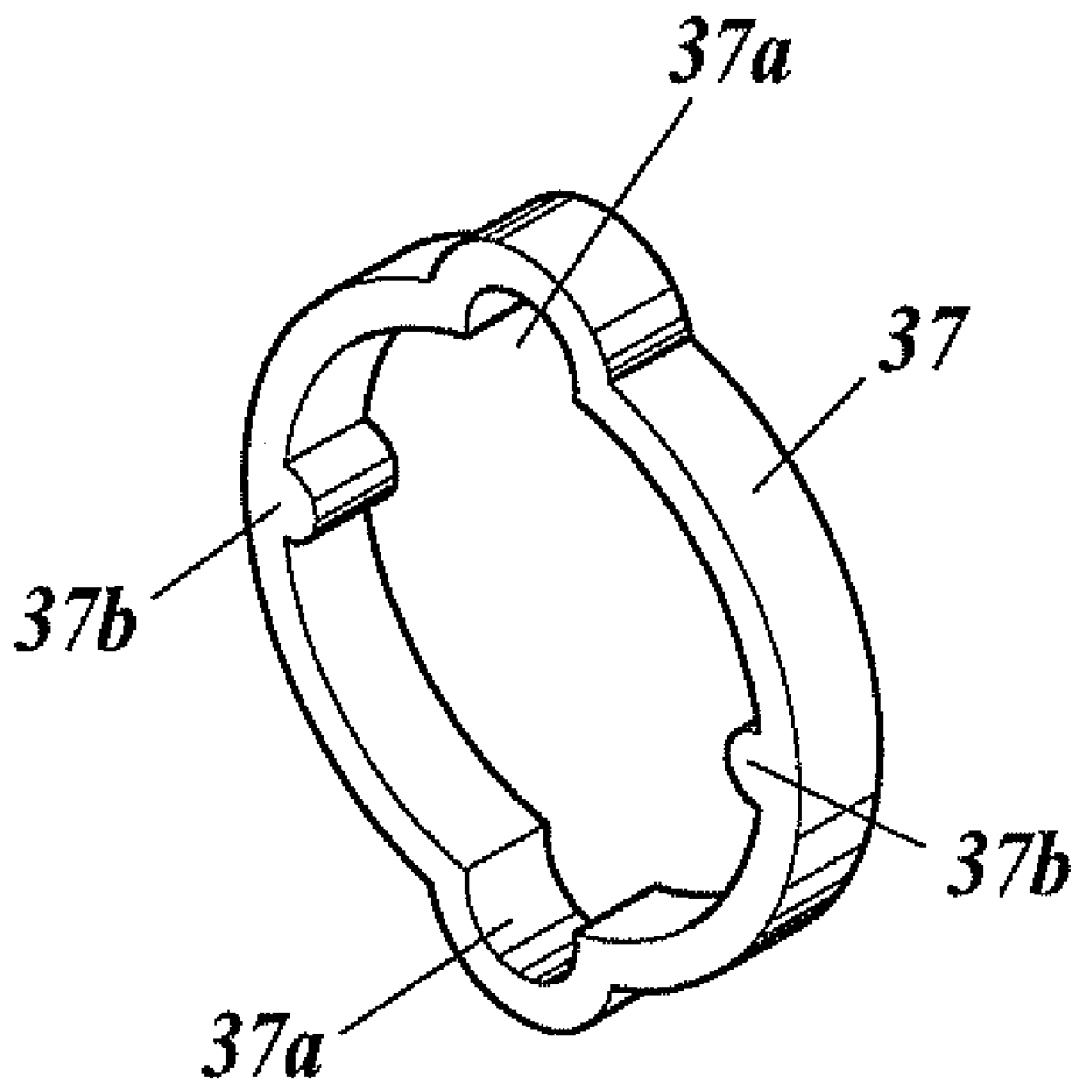
FIG. 7 is a perspective view showing a clutch member of the servo of the present embodiment.

A clutch mechanism 35 is built between the final gear 32j of the reduction gear mechanism 32 and the output shaft 34, and the gear 32j and the output shaft 34 are structured so that they can rotate independently of each other. More specifically, as shown in FIG. 5, two half cylinder shaped projections 32j-1 and 32j-1 are provided on an end face of the gear 32j. On the other hand, as shown in FIG. 6, a gear 36 is provided on the end face of the output shaft 34. The gear 32j and the gear 36 are connected to each other through a clutch member 37 as shown in FIG. 7. The clutch member 37 is ring-shaped and two concave sections 37a and 37a to engage with the two half cylinder shaped projections 32j-1 and 32j-1 and two convex sections 37b and 37b to mesh with teeth of the gear 36 are formed on the inner circumference of the clutch member 37. With this, when the output shaft 34 is forced to stop for some reason while a shaft of the servo motor 31 is rotating, the clutch member 37 elastically deforms to cut off power transmission from gear 32j to gear 36 and consequently to output shaft 34.

In the present embodiment, the gears 32g and 32j are formed in a ring shape, and a central shaft (not shown) of the output shaft 34 is inserted through the gears 32g and 32j so that a tip is integrated with a later-described rotating disk 33a. Also, in the present embodiment, on the outer circumference face of the output shaft 34, splines 34a stretching in a shaft direction are provided with predetermined spacing, however the splines 34a do not have to be provided.

Figure 8:
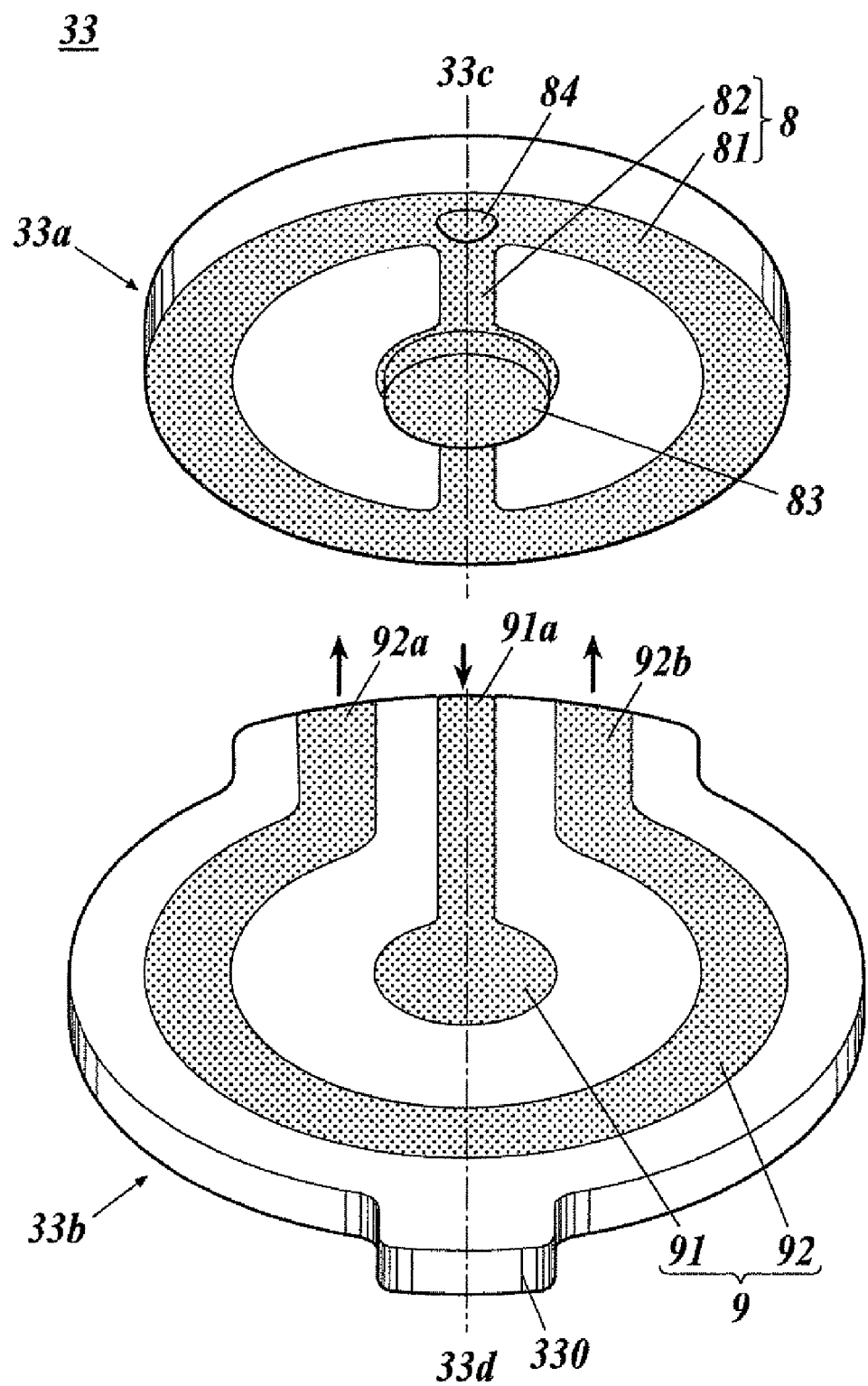
FIG. 8 is an exploded perspective view showing a potentiometer of the present embodiment.

The potentiometer 33 detects a rotation angle of the servo motor 31, and as shown in FIG. 4 and FIG. 8, includes rotating disks 33a and 33b.

The rotating disk (first rotating disk) 33a is a disk shaped member provided at the tip of the above-described central shaft of the output shaft 34 and rotates together with the output shaft 34. On the other hand, the rotating disk (second rotating disk) 33b is a plate-shaped member supported by the case 30 and includes a lever 330 protruding outward from the case 30. The lever 330 allows the rotating disk 33b to rotate in a plane parallel to the rotating disk 33a and to rotate around an axis of the output shaft 34 by user operation.

Here, in the present embodiment, the angular range in which the rotating disk 33b can rotate is about 15 degrees. In the description below, as shown in FIG. 8, predetermined center lines in the rotating disks 33a and 33b are described as reference lines 33c and 33d.

As variable resistance circuits of the present invention, circuit patterns 8 and 9 are provided on faces of the rotating disks 33a and 33b opposing to each other.

The circuit patterns 8 and 9 are formed from conductive material such as carbon, and when the rotating disks 33a and 33b relatively rotate, resistance value changes according to the relative angle between the reference lines 33c and 33d.

Specifically, the circuit pattern 8 provided on the rotating disk 33a includes circular shaped circuit section 81 and center line circuit section 82 which passes through the center of the circular circuit section 81 on the reference line 33c to connect two points on the circumference. A terminal 83 is provided on a middle point of the center line circuit section 82, that is, center of the circular circuit section 81 and a terminal 84 is provided on the intersection point of circular circuit section 81 and center line circuit section 82.

The circuit pattern 9 provided on the rotating disk 33b includes a central circuit section 91 stretching on the reference line 33d from a position corresponding generally to the position of the terminal 83 so as to enable contact with the terminal 83, to an end portion at an opposite side of the disk 33b relative to the lever 330, and an arc-shaped circuit section 92 facing the circular circuit section 81. One electrode between a positive electrode or negative electrode of a battery (not shown) is connected to an electrode 91a of an end portion of the central circuit section 91 and the other electrode is connected to electrodes 92a and 92b of an end portion of the arc-shaped circuit section 92.

In the potentiometer 33 described above, for example, electric current flowing from the central circuit section 91 of the circuit pattern 9 flows through terminal 83 and the center line circuit section 82 of the circuit pattern 8, then flows from the terminal 84 to the arc circuit section 92 of the circuit pattern 9 again, and flows out from two places, electrodes 92a and 92b. Therefore, when the reference lines 33c and 33d of the rotating disks 33a and 33b do not match, the resistance value between the electrodes 91a and 92a and the resistance value between the electrodes 91a and 92b differ by the amount of the relative angle, in other words, by the difference between lengths of the paths from the terminal 84 to the end portions of the electrodes 92a and 92b, and as a result, the rotation angle of the output shaft 34 of the servo motor 31 is detected as the difference of analog electric current.

Figure 9:
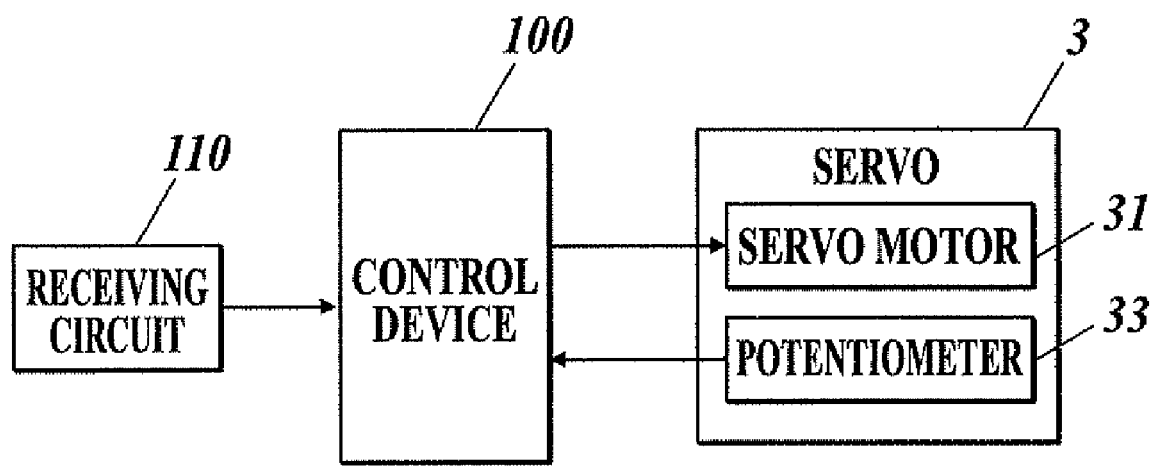
FIG. 9 is a control block diagram of the present embodiment.

In each servo 3 described above, as shown in FIG. 9, a battery (not shown), a control device 100 and receiving circuit 110 are connected to each other. In the present embodiment, the battery, control device 100 and receiving circuit 110 are included in the torso section 10 of the robot toy 1.

According to a program stored in an inner storage device, the control device 100 processes signals and the like from the receiving circuit 110 and potentiometer 33 and controls operation of the servo motor 31 by digital signals. For example, when power of the robot toy 1 is turned on, the control device 100 applies an initial pulse to the servo motor 31 according to a signal from the potentiometer 33 to move the servo 3 to the center position (servo zero position). In the present embodiment, the center position of the servo 3 is a position where, in the potentiometer 33, electric current between the electrodes 91a and 92a and electric current between the electrodes 91a and 92b are equal, in other words, a position where the relative angle is 0.

[Structure of Leg Section]

Next, the structure of the leg section 12 is described.

Figure 10:
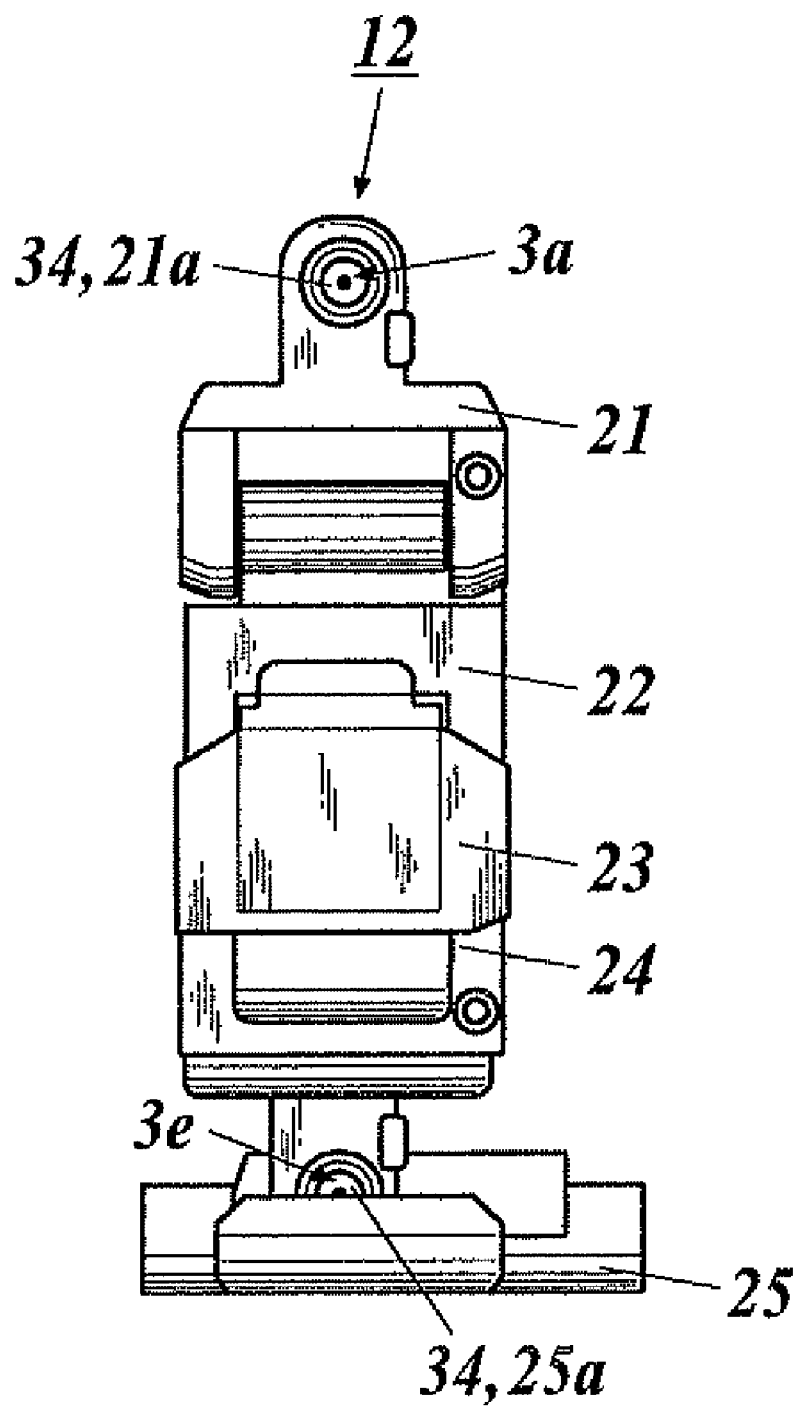
FIG. 10 is an elevation view showing a leg section of the robot toy of the present embodiment.
Figure 11:
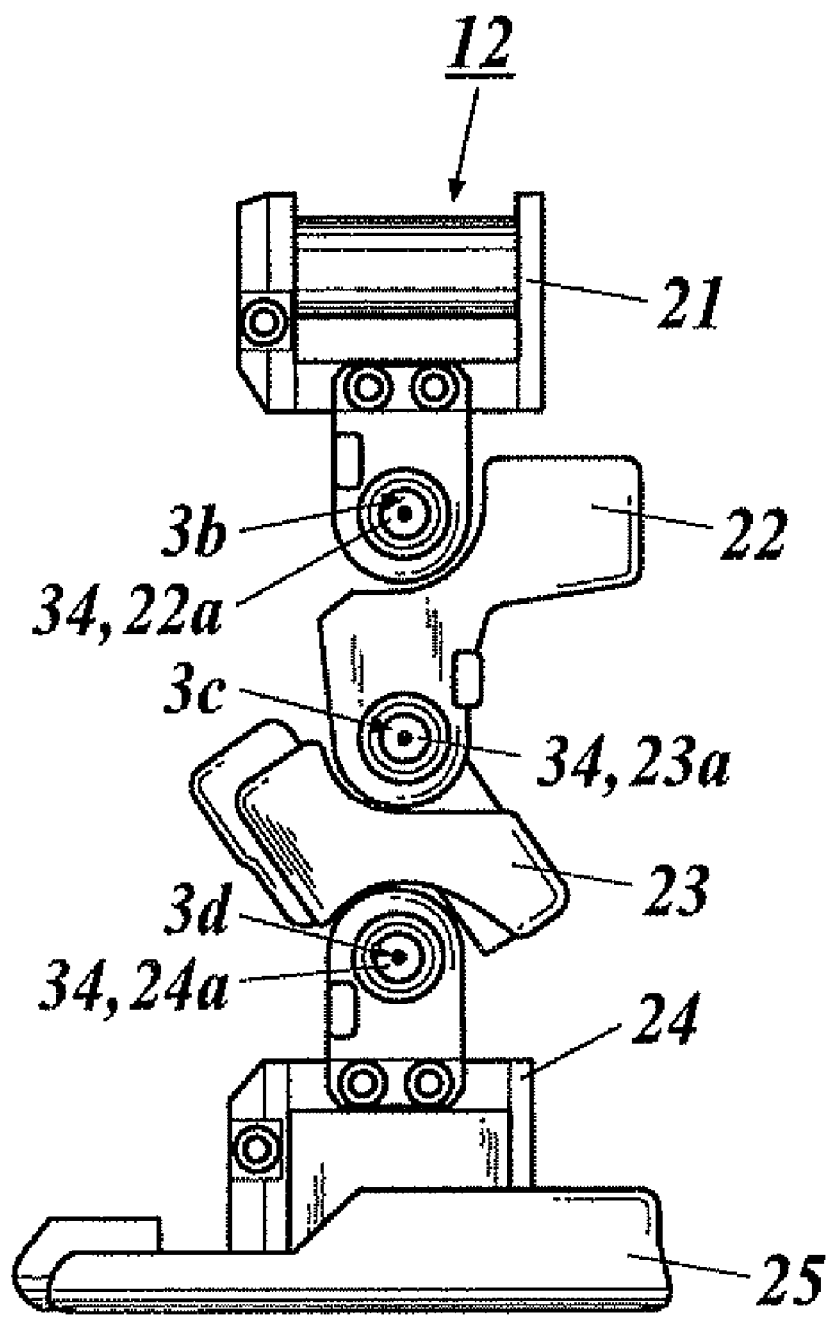
FIG. 11 is a right side view showing a leg section of the robot toy of the present embodiment.

As shown in FIG. 10 (elevation view) and FIG. 11 (right side view), the leg section 12 includes broadly five blocks 21, 22, 23, 24 and 25.

Among these blocks, block 21 is connected to the torso section (block) 10 through the servo 3 (hereinafter referred to as servo 3a, in order to distinguish from other servos 3). In other words, the block 21 is connected to the torso section 10 by fitting the output shaft 34 of the servo 3a provided at the bottom edge portion of the torso section 10 into a boss 21a. With this, when the servo motor 31 of the servo 3a is driven to rotate, the block 21 moves with respect to the torso section 10.

A concave section (not shown) meshing with the spline 34a of the output shaft 34 is provided on the inner circumference face of the above-described boss 21a and later-described bosses 22a to 25a.

The servo 3 (hereinafter referred to as servo 3b in order to distinguish from other servos 3) is provided on the bottom edge portion of the block 21 and the block 22 are connected through the servo 3b. In other words, the block 22 is connected to the block 21 by fitting the output shaft 34 of the servo 3b into the boss 22a. With this, when the servo motor 31 of the servo 3b is driven to rotate, the block 22 moves with respect to the block 21.

The servo 3 (hereinafter referred to as servo 3c in order to distinguish from other servos 3) is provided on the bottom edge portion of the block 22 and the block 23 are connected through the servo 3c. In other words, the block 23 is connected to the block 22 by fitting the output shaft 34 of the servo 3c into the boss 23a. With this, when the servo motor 31 of the servo 3c is driven to rotate, the block 23 moves with respect to the block 22.

The servo 3 (hereinafter referred to as servo 3d in order to distinguish from other servos 3) is provided on the bottom edge portion of the block 23 and the block 24 are connected through the servo 3d. In other words, the block 24 is connected to the block 23 by fitting the output shaft 34 of the servo 3d into the boss 24a. With this, when the servo motor 31 of the servo 3d is driven to rotate, the block 24 moves with respect to the block 23.

The servo 3 (hereinafter referred to as servo 3e in order to distinguish from other servos 3) is provided on the bottom edge portion of the block 24 and the block 25 are connected through the servo 3e. In other words, the block 25 is connected to the block 24 by fitting the output shaft 34 of the servo 3e into the boss 25a. With this, when the servo motor 31 of the servo 3e is driven to rotate, the block 25 moves with respect to the block 24.

Figure 12:
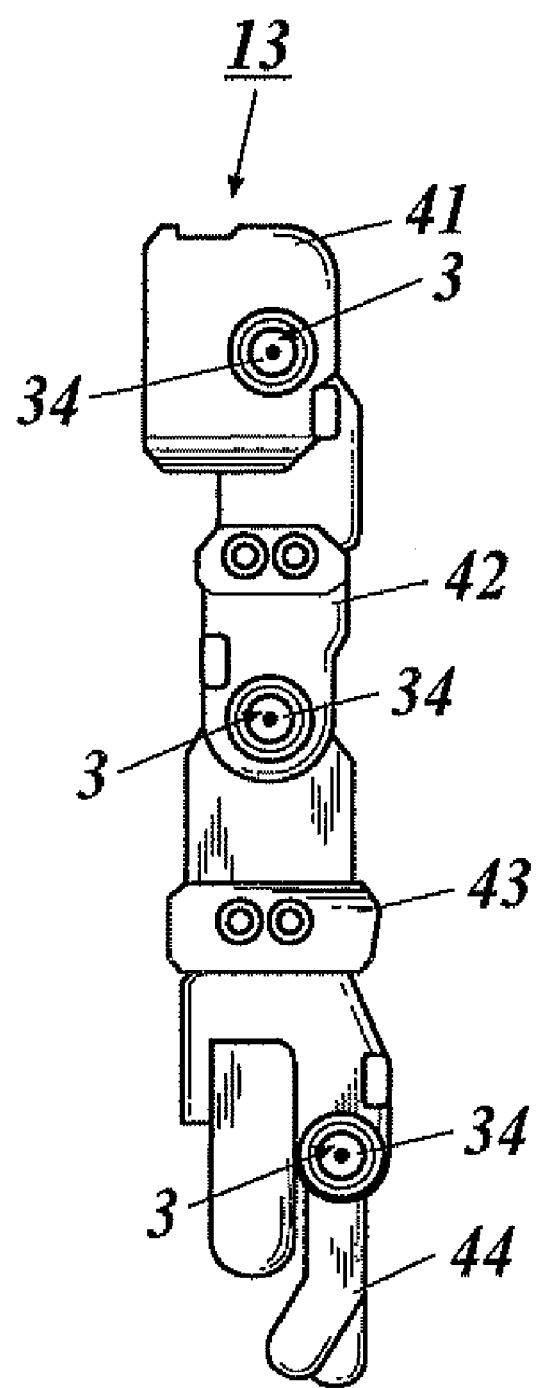
FIG. 12 is an elevation view showing an arm section of the robot toy of the present embodiment.
Figure 13:
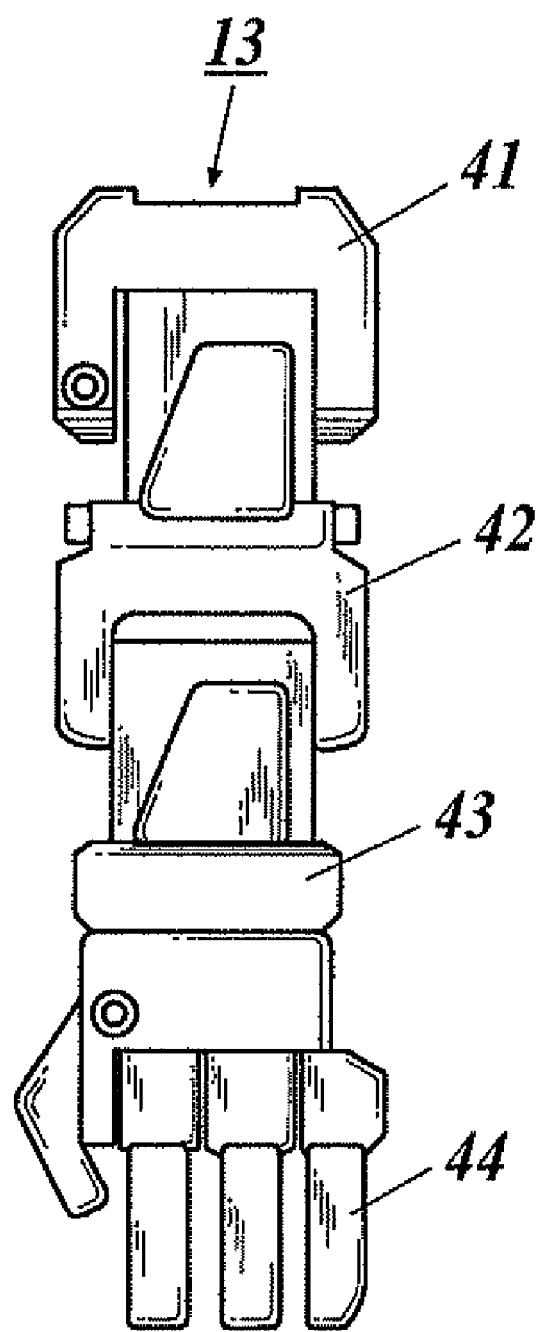
FIG. 13 is a right side view showing an arm section of the robot toy of the present embodiment.

As shown in FIG. 12 (elevation view) and FIG. 13 (right side view), the arm section 13 includes broadly five blocks 41, 42, 43, and 44. These blocks 41, 42, 43, and 44 are connected through the servos 3 from the torso section 10 in this order. A connection structure of the torso section (block) 10 and block 41 can be the same as a connection structure of the blocks connected to each other in the arm section 13 or the block 41 can be fixed to the torso section 10.

Next, the assembling method of the robot toy 1 is described with leg section 12 as an example.

For example, when the torso section 10 and the block 21 are connected to each other, first, the output shaft 34 of the servo 3 included in the torso 10 is fitted into the boss 21a of the block 21 (fitting process). Next, the control device 100 energizes the servo motor 31 of the servo 3a to output the center position (servo zero position) of the servo 3a, in other words, the position where current between the electrodes 91a and 92a and current between the electrodes 91a and 92b are equal on the potentiometer 33 (center position output process).

Next, it is judged whether or not an angle between the torso section 10 and block 21 is an angle of home position (judging process) and when it is judged that the angle between the torso section 10 and block 21 is not the angle of home position, a rotating process of the rotating disk 33b through the lever 330 of the servo 3a (rotation angle adjustment process) and the above-described center position output process and judging process are repeated. Incidentally, the above-described judging process can judge whether or not the angle between the torso section 10 and block 21 is the angle of the home position visually or judging can be done using a template previously formed in the angle of the home position.

Then, when it is judged in the judging process that the angle between the torso section 10 and block 21 is the angle of the home position, the connecting of the torso section 10 and block 21 ends.

In the remaining process, similarly, adjacent blocks of the leg section 12 are connected to each other and adjacent blocks of the arm section 13 are connected to each other and the assembly of the robot 1 ends.

According to the robot toy 1 described above, it is judged whether or not a positional relation of the one block (for example, block 10) and the other block (for example, block 21) matches the home position after the center position of the servo 3 is output, and by repeating a process of rotating the rotating disk 33b relatively to the rotating disk 33a when it is judged that the positional relation does not match the home position, and allowing the servo 3 to output the center position again to judge whether or not the positional relation matches the home position, the center position of the servo 3 can be matched with the home position. Therefore, since the servo zero position and home position can be matched without connecting the servo 3 to a personal computer and operating an editor, compared to the conventional method, the home position and the servo zero position of the robot toy 1 can be easily matched.

Since the rotating disk 33b includes a lever 330 protruding outward from the case 30 of the servo 3, the rotating disk 33b rotates relatively to the rotating disk 33a by the user operation of the lever 330, therefore, the rotating disk 33b can be rotated without removing the case 30 of the servo 3. Therefore, it is easier to match the home position and the servo zero position of the robot toy 1.

Although various exemplary embodiments have been shown and described, the invention is not limited to the embodiments shown, and thus various modifications without leaving the scope of the spirit of the invention are possible.

For example, the variable resistance circuits of the present invention are described as circuit pattern 8 and 9 in a shape shown in FIG. 8, however, the circuit can be another shape.

The entire disclosure of Japanese Patent Application No. 2007-317402 filed on Dec. 7, 2007 including description, claims, drawings and abstract are incorporated herein by reference in its entirety.

What is claimed is:

1. A robot toy comprising:
a first block including a servo;
a second block connected to the first block by fitting an output shaft of the servo into a boss; and
a servo control section to control the servo, wherein the servo is provided with,
a first rotating disk to rotate following the output shaft;
a second rotating disk provided facing the first rotating disk to rotate relatively to the first rotating disk in a plane parallel to the first rotating disk according to user operation; and
an angle detection section to detect a relative angle between predetermined reference lines on the first rotating disk and the second rotating disk,
wherein the second rotating disk includes a lever protruding outward from a case of the servo and the second rotating disk rotates relatively to the first rotating disk by the user operation of the lever, and
the servo control section includes a center position control section to rotate the output shaft and the first rotating disk, and to control the servo while a position of the servo, when the relative angle is 0, is a center position.

2. The robot toy according to claim 1, wherein
the angle detection section includes variable resistance circuits provided on faces of the first rotating disk and the second rotating disk facing each other, and resistance values of the variable resistance circuits change according to the relative angle.

3. An assembling method of a robot toy to assemble a robot toy of claim 1, the method comprising the successive steps of:
fitting the output shaft into the boss;
outputting the center position of the servo by the servo control section; and
judging whether or not a positional relation between the first block and the second block matches home position, wherein
when judged in the judging step the positional relation does not match the home position, the method repeats a rotation angle adjusting step where the second rotating disk rotates relatively to the first rotating disk, the center position outputting step and the judging step; and
when judged in the judging step the positional relation matches the home position, connecting of the first block and the second block ends.

4. An assembling method of a robot toy to assemble a robot toy of claim 1, the method comprising the successive steps of:
fitting the output shaft between the first and second blocks;
outputting the center position of the servo by the servo control section; and
judging whether or not a positional relation between the first block and the second block matches home position, wherein
when judged in the judging step the positional relation does not match the home position, the method repeats a rotation angle adjusting step where the second rotating disk rotates relatively to the first rotating disk, the center position outputting step and the judging step; and
when judged in the judging step the positional relation matches the home position, connecting of the first block and the second block ends.

5. A robot toy comprising:
a first block;
a second block movable relative to the first block via a servo;
an output shaft of the servo positioned between the first and second blocks, and
a servo control section to control the servo,
wherein the servo includes—
a first disk to rotate with the output shaft;
a second disk facing the first rotating disk to rotate relative to the first rotating disk; and
an angle detection section to detect a relative angle between predetermined reference lines on the first rotating disk and the second rotating disk,
and wherein the second rotating disk includes a lever and the second disk rotates relative to the first rotating disk by user operation of the lever, and
the servo control section includes a center position control section to rotate the output shaft and the first rotating disk, and to control the servo while a position of the servo, when the relative angle is 0, is a center position.

6. The robot toy according to claim 5, wherein
the angle detection section includes variable resistance circuits provided on faces of the first rotating disk and the second rotating disk facing each other, and resistance values of the variable resistance circuits change according to the relative angle.

* * * * *